US009131403B1

(12) United States Patent
Courchesne et al.

(10) Patent No.: US 9,131,403 B1
(45) Date of Patent: Sep. 8, 2015

(54) METHOD, COMPUTING DEVICE AND COMPUTER PROGRAM PRODUCT FOR VISUAL REPRESENTATION OF RF PROPAGATION

(71) Applicant: IBwave Solutions Inc., Montreal (CA)

(72) Inventors: Benoit Courchesne, Laval (CA); Marc-Antoine Lamontagne, Montreal (CA); Eric Vienneau, Mascouche (CA); Vladan Jevremovic, Houston, TX (US)

(73) Assignee: IBWAVE SOLUTIONS INC., Montreal, Quebec (CA)

( * ) Notice: Subject to any disclaimer, the term of this patent is extended or adjusted under 35 U.S.C. 154(b) by 0 days.

(21) Appl. No.: 14/496,701

(22) Filed: Sep. 25, 2014

(51) Int. Cl.
*H04W 16/00* (2009.01)
*H04W 24/08* (2009.01)
*G06F 3/0484* (2013.01)

(52) U.S. Cl.
CPC ........... *H04W 24/08* (2013.01); *G06F 3/04842* (2013.01)

(58) Field of Classification Search
CPC ............................ H04W 16/20; H04W 16/225
USPC ........................................................ 455/446
See application file for complete search history.

(56) References Cited

U.S. PATENT DOCUMENTS

| 6,992,625 | B1 * | 1/2006 | Krumm et al. ................ 342/451 |
| 8,185,121 | B2 * | 5/2012 | Vangati ......................... 455/446 |
| 2004/0143428 | A1 * | 7/2004 | Rappaport et al. .............. 703/22 |
| 2005/0003823 | A1 * | 1/2005 | Kim et al. ..................... 455/446 |
| 2006/0073832 | A1 * | 4/2006 | Pfister .......................... 455/446 |
| 2008/0075051 | A1 * | 3/2008 | Dundar et al. ................ 370/338 |
| 2008/0182584 | A1 * | 7/2008 | Le ................................. 455/446 |
| 2013/0183961 | A1 * | 7/2013 | Bassiri et al. ................. 455/423 |
| 2013/0194276 | A1 * | 8/2013 | Sato et al. ..................... 345/440 |

* cited by examiner

*Primary Examiner* — Wen Huang

(57) ABSTRACT

The present disclosure relates to a method, computing device and computer program product for visual representation of radio frequency (RF) propagation of at least radio cell on a floor plan of a building. The floor plan and the at least one radio cell are displayed on a display of the computing device. At least one density zone is defined on the floor plan via a user interface of the computing device. A RF propagation calculation strategy is selected via the user interface of the computing device. The RF propagation for the at least one radio cell is calculated by a processing unit of the computing device, based on the configuration of the radio cell, the position of the radio cell with respect to the density zone and the selected RF propagation calculation strategy. The processing unit of the computing device further adjusts the calculated RF propagation as a function of a scale of the floor plan.

19 Claims, 14 Drawing Sheets

400

METHOD, COMPUTING DEVICE AND COMPUTER PROGRAM PRODUCT FOR VISUAL REPRESENTATION OF RF PROPAGATION

TECHNICAL FIELD

The present disclosure relates to the field of RF propagation determination for radio cells. More specifically, the present disclosure relates to a method, computing device and computer program product for RF propagation calculation and visual representation thereof.

BACKGROUND

Planning a deployment of radio cells is a complex task, which requires taking into consideration a variety of parameters. The planning is particularly difficult for the deployment of radio cells inside a building. The parameters to take into consideration include: a particular layout of the building, propagation and absorption characteristics of the building, specific radio interface(s) supported by the radio cells, specific characteristics of the radio cells, interferences between radio cells, etc. To obtain an optimal coverage, the deployed radio cells need to be positioned close enough to each other, while at the same time minimizing interferences there between. Also, the position of each radio cell should be selected judiciously to minimize the total number of radio cells required to obtain optimal coverage.

Many software tools have been developed to plan radio cell deployment and simulate radio cell coverage. Such tools were initially designed to support deployment of macro cells in a cellular network. With the advent of small cells, other software tools were developed to support specific constraints encountered in small cell planning and deployment. Small cells may be deployed indoor and/or outdoor, for instance to improve radio coverage provided by a cellular network of a specific Network Operator in a building, around a building or in a business district of a city.

Typically, planning radio cell deployments requires a first step of data collection and memorization (e.g. via a data collection software tool) on the premises of the deployment, followed by a second step where the planning software tool effectively processes the collected data to simulate radio cell coverage. This two steps planning process lacks in flexibility and reactivity.

Furthermore, radio frequencies propagation require complicated mathematical equations to accurately simulate radio cell propagation inside buildings, so as to appropriately take into consideration the multiple parameters which affect RF propagation inside a building. These complicated mathematical equations require such processing capabilities, which cannot be realistically delivered by portable computing devices such as tablets and smartphones. Because of the complexity of the environment, RF propagation calculations inside buildings is usually performed by technicians and engineers specializing in RF propagation inside buildings.

Therefore, there is a need for a new a method, computing device and computer program product for RF propagation calculation and visual representation thereof.

SUMMARY

In accordance with a first aspect, the present disclosure relates to a method for visual representation of RF propagation of at least one radio cell on a floor map of a building. The method comprises displaying a digital image of the floor map on a display of a computer device. The method further comprises defining at least one density zone on the floor plan via a user interface of the computing device, and selecting also via the user interface a RF propagation calculation strategy. The method further comprises configuring the at least one radio cell via the user interface, and positioning the at least one radio cell over the digital image of the floor plan displayed on the display also via the user interface. The method also comprises calculating by a processor of the computing device RF propagation for each of the at least one radio cell based on the selected propagation calculation strategy and position on the floor plan with respect to the at least one density zone. The method additionally comprises adjusting by the processing unit the RF propagation calculated for each of the radio cell as a function of a scale of the floor plan. The method finally generates by the processing unit the visual representation of RF propagation and displays the visual representation over the image of the floor plan.

In accordance with a second aspect, the present disclosure relates to a computing device for visually representing RF propagation of at least one radio cell on a digital image of a floor plan. The computing device comprises a display, a user interface and a processing unit. The display is adapted for displaying the digital image of the floor plan and the visual representation or the RF propagation of each of the radio cell. The user interface is adapted for allowing a user of the computing device to: define at least one density zone on the image of the floor plan, selecting via the user interface of the computing device a RF propagation calculation strategy, configuring the at least one radio cell, and positioning at least one radio cell over the digital image of the floor plan. The processing unit is adapted for: calculating RF propagation of each radio cell based on RF propagation formulas associated with selected density zones, position of the cells within density zones, adjusting the RF propagation calculated of each radio cell as a function of a scale of the floor plan, and generating the visual representation of RF propagation of each radio cell.

In accordance with a third aspect, the present disclosure relates to a computer program product deliverable via an electronically-readable media such as storage media and communication links, the computer program product comprising instructions which when executed by a processing unit of a computing device provide RF propagation calculation and visual representation of at least one radio cell in an area by implementing the aforementioned method.

In a particular aspect, the visual representation of RF propagation is displayed as a heat map.

In another particular aspect, one of the at least one radio cell is selected via the user interface. The selected radio cell is displaced in the area via the user interface. The visual representation of RF propagation of the selected radio cell being displaced is dynamically calculated by the processing unit relative to other radio cells displayed in the area. The dynamically calculated RF propagation for the selected radio cell being displaced is displayed on the display.

BRIEF DESCRIPTION OF THE DRAWINGS

Embodiments of the disclosure will be described by way of example only with reference to the accompanying drawings, in which.

DETAILED DESCRIPTION

Figure 1:
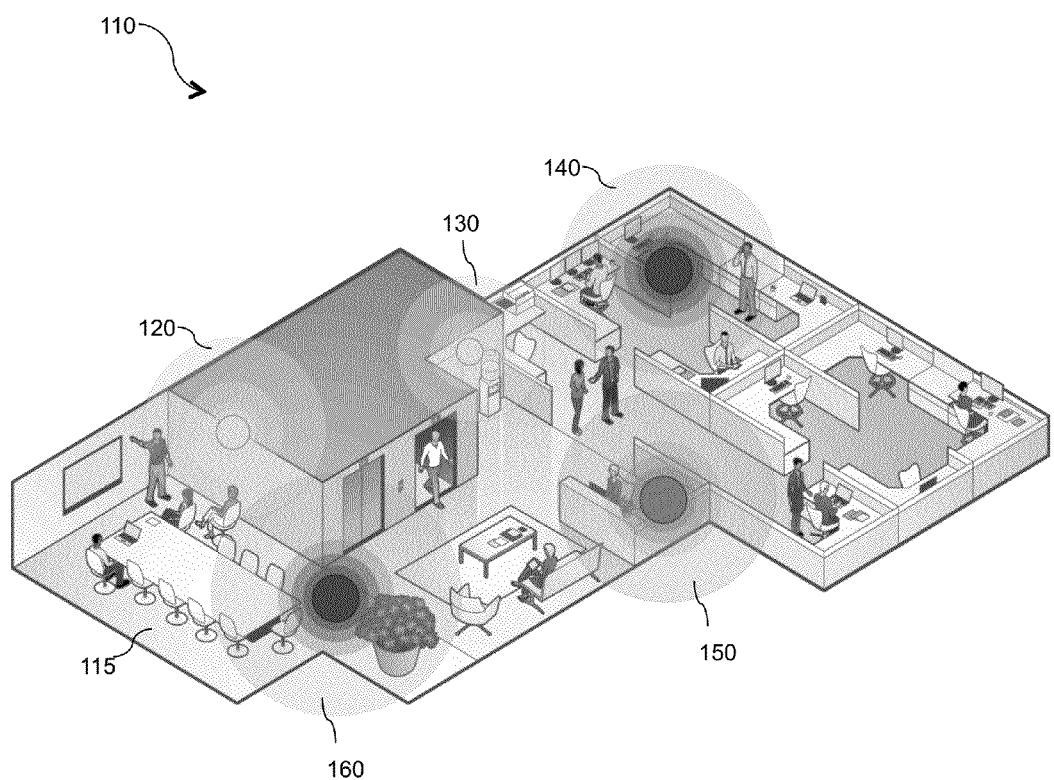
FIG. 1 illustrates a deployment of radio cells in a building.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the determination and representation of RF propagation of radio cells.

The following terminology is used throughout the present disclosure:

Radio cell: radio access node operating in licensed and/or unlicensed spectrum. The radio cell may provide a single or a combination of air interfaces, including Wideband Code Division Multiple Access (W-CDMA), Long Term Evolution (LTE), Wi-Fi, etc. The radio cell is connected to a network backbone, such as a cellular network backbone or a private network backbone.

Small cell: a particular type of radio cell, with a range of ten meters to one or two kilometers. The present disclosure addresses small cells for indoor deployments, where the small cells are deployed on one or several floors of a building. In this context, the small cells typically have a range of approximately ten meters. However, the teachings of the present disclosure are not limited to such limited range, which are used herein for exemplification purposes only.

RF propagation: property of radio cell, which can be estimated, simulated, calculated and/or measured. An example of RF propagation is the Signal to Noise Interference Ratio (SINR) of a serving radio cell relative to other, non-serving radio cells. The term serving radio cell refers to the strongest estimated/simulated/calculated and/or measured signal at a position on the floor plan. All other estimated/simulated/calculated and/or measured signals at the same position on the floor plan are considered originating from non-serving radio cells.

Visual representation of RF propagation: an area about radio cell where radio waves propagate. A limit of the propagation visual representation can be defined by a power threshold or relative power threshold of RF propagation: if the emitted power of radio signal calculated at a particular position is above the power threshold, the particular position is within the propagation visual representation. Otherwise, the particular position is outside the propagation visual representation. Stated differently, the propagation visual representation defines an area where calculated RF propagation is within a predetermined radio quality requirement(s) and in which a device could use the radio cell to carry out a communication (e.g. voice and/or data transmission) with a satisfying quality. A power threshold can be used when the visual representation is a contour. When the visual representation is a heat map, the radio quality is represented by a combination of colors, each color corresponding to a calculation of the radio quality (the degradation of the radio quality is represented by a change of color).

Air interface: radio-based communication link characterized by frequency, channel bandwidth and modulation scheme.

Referring now to FIG. 1, an exemplary deployment of small cells in a building is represented. The building comprises a floor 110, where a plurality of small cells (not represented in FIG. 1) have been deployed, each small cell providing radio coverage as represented by the visual representation of RF propagation 120, 130, 140, 150 and 160. The small cells have been positioned to cover areas of the floor where communications via the small cells need to be supported. For example, a conference room 115 is covered by two small cells providing the radio coverage as shown by the visual representation of RF propagation 120 and 160. Furthermore, an optimal position for each small cell is determined, to reduce radio interferences between small cells and maximize radio coverage (as shown by the visual representation of RF propagation 120, 130, 140, 150 and 160). Visual representation of RF propagation of the small cells (e.g. a propagation contour) is represented as circles of different colors and different radius. Although shown as circles, those skilled in the art will understand that circles are used for exemplary purposes, and the shape of the RF propagation of each small cell depends on the type of antenna being used by each cell. The radius of each circle corresponds to a calculated RF propagation of the cell: it depends among other things on the transmission power of the cell and the environment in which it is used. A description of the calculation of the RF propagation will be provided further.

Devices such as smartphones or tablets, when located within one of the radio coverage corresponding to the visual representation of RF propagation (120, 130, 140, 150 or 160), can receive and transmit voice or data via the small cells. The small cells are ultimately connected to a backbone network of a Mobile Operator, for further transmission and reception of the voice and data via the Mobile Operator network. As will be illustrated later in the description, a small cell supporting several air interfaces may transmit those using separate spectrum bands, which differ in RF propagation characteristics. The small cells are generally deployed within the floor 110 of the building to compensate a bad radio signal reception from macro cell(s) of the Mobile Operator network covering the building area, or to complement the voice and/or data throughput provided by the macro cell(s).

Referring now concurrently to FIGS. 2A-D, 3 and 4A-4D, a method 200 and computing device 300 for visual representation of RF propagation are represented.

The computing device 300 comprises a processing unit 310, having one or more processors (not represented in FIG. 3) capable of executing instructions of a computer program. Each processor may further have one or several cores. The computing device 300 also comprises memory 320 for storing instructions of the computer program, data generated by the execution of the computer program, etc. Only a single memory 320 is represented in FIG. 3, but the computing device 300 may comprise several types of memories, including volatile memory (such as a volatile Random Access Memory (RAM)) and non-volatile memory (such as a hard drive).

The computing device 300 further comprises a display 340 (e.g. a regular screen or a tactile screen) for displaying a visual representation of RF propagation calculated according to the method 200. The computing device 300 also comprises a user interface 350 for allowing a user to interact with the computing device 300 when performing the method 200. The user interface 350 may consist of one (or several) of the following: a mouse, a keyboard, a trackpad, a touchscreen, etc. The computing device may further comprise a communication interface 330 for exchanging data with other entities (such as a server 300) through communication links 355 (e.g. a cellular network, a fixed Internet network, etc.). The sever 360 comprises a processing unit 370, memory 390 and a communication interface 380 for exchanging data with the computing device 300 through the communication links 355.

In the rest of the description, reference will be made to instructions of a specific computer program. The instructions of the specific computer program implement the steps of the method 200. The instructions are comprised in a computer program product and provide for visual representation of RF propagation, when executed by a processor of the processing unit 310 of the computing device 300. The computer program product is deliverable via an electronically-readable media such as a storage media or via the communication links 355 (through the communication interface 330).

Figure 3:
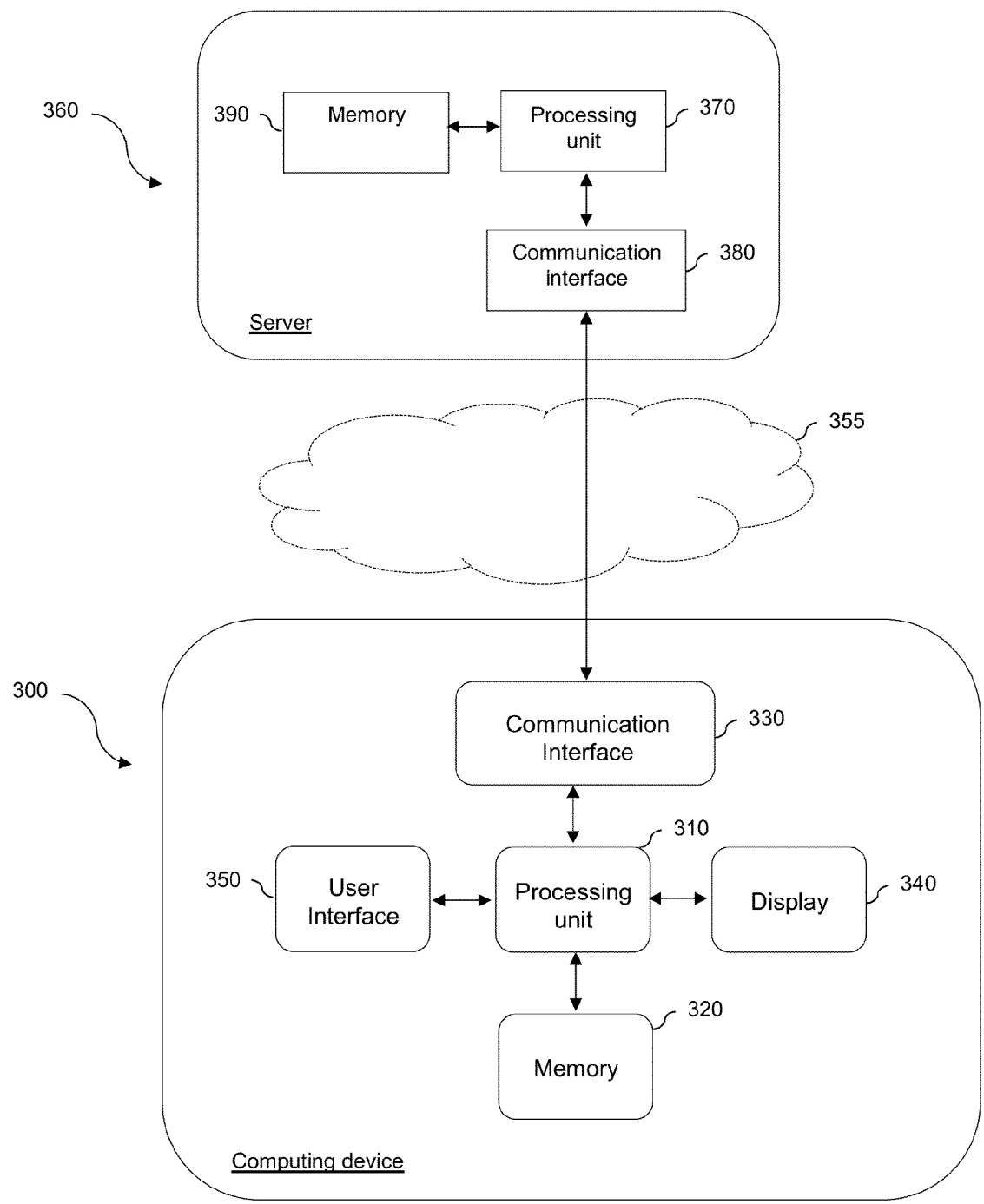
FIG. 3 illustrates a computing device for implementing the method of FIGS. 2A to 2D.

The computing device 300 represented in FIG. 3 is for exemplary purposes only, and is not intended to limit the scope of the present disclosure. Examples of computing devices 300 capable of performing the method 200 include laptops, tablets, smart phones and any other computing device equipped with a display and user interface. Such computing devices have a display 340 large enough to allow users to comfortably visualize a visual representation of RF propagation calculated and adjusted by the processing unit 310. The computing device 300 also have a form factor that makes them easily transportable at various indoor premises for performing the method 200 on-site.

FIGS. 4A to 4D represent exemplary digital images of floor map of a building displayed on the display 340 of the computing device 300 when performing the method 200. More specifically, FIGS. 4A to 4D illustrates the digital image of the floor plan as a graphical user interface (GUI) 400 allowing a user to interact (via the user interface 350) with the computer program performing the method 200 when its instructions are executed by the processing unit 310. The GUI 400 also displays the information and interactions generated by the computer program performing the method 200 when its instructions are executed by the processing unit 310.

Reverting concurrently to FIGS. 2A-2D and FIG. 3, the method 200 comprises two initial steps: inputting a digital image of a floor plan (step 205), and inputting a scale of the floor plan (step 210). These two steps may be performed by a user of the computing device 300, or may be provide by the server 360. For example, when the user of the computing device 200 is on site, the user may take a picture with a camera (not shown separately on FIG. 3 but part of the communication interface 330) of the computing device 300 of a fire exit floor plan. Alternatively, the user of the computing device 300 may take a picture of an architectural plan of the floor plan, or any type of graphical representation of the floor plan which may be converted into a digital image of the floor plan. Inputting the scale of the floor plan (step 210) may be performed by providing directly the scale used on the image digitalized, or by entering a size of the image and a size of the floor, to deduct the scale therefrom. Other methods may be used to input the digital image and scale of the floor plan.

Figure 4A:
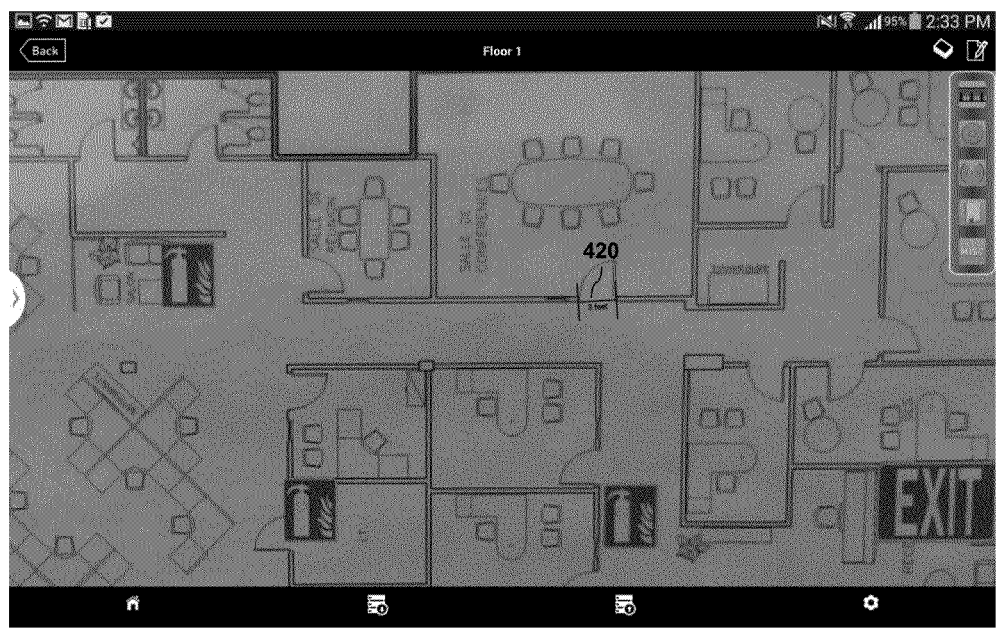
FIGS. 4A to 4D illustrate the method of FIG. 2, according to a first embodiment involving two radio cells.

The method continues with displaying (step 215) the floor plan on the display 340 of the computing device 300. For example, as illustrated in FIG. 4A, the floor plan 400 is a digital image of a graphical representation (e.g. a floor plan image) of an area located inside a building. The size (the surface in square meters) and the shape of the floor plan 400 may vary from one building to another. If the floor plan 400 is too large to be integrally displayed on the display 340, only a portion of the floor plan 400 is displayed and a user can scroll (vertically and/or horizontally) across the floor plan 400 via the user interface 350. As illustrated in FIG. 4A, the floor plan 400 may include one or several rooms, corridors, etc., as well as the walls of these rooms and corridors. The floor plan 400 may also include furniture located inside the rooms. The floor plan 400 may be obtained by downloading it through the communication links 355 (via the communication interface 330) from the server 360, where the floor plan is stored in the memory 390 and transmitted via the communication interface 380. Alternatively, the floor plan 400 may be obtained by taking a picture with the computing device 300 of a physical graphical representation (e.g. an emergency exit plan).

When the scale is not inputted (step 210), the method 200 may also comprise the step (not represented in FIGS. 2A-D) of determining a scale of the floor plan 400. The determination of the scale may consist in positioning a ruler 420 (as illustrated in FIG. 4A) over the graphical representation of the floor plan and assigning a measured length to it. The computer program is then capable of calculating the scale of the floor plan 400 based on the assigned measured length and the length of the ruler 420 displayed on the graphical representation of the floor plan. For example, the user may position the ruler 420 on the width of a door displayed on the floor plan and measure the effective width of the corresponding door in the building.

Figure 6:
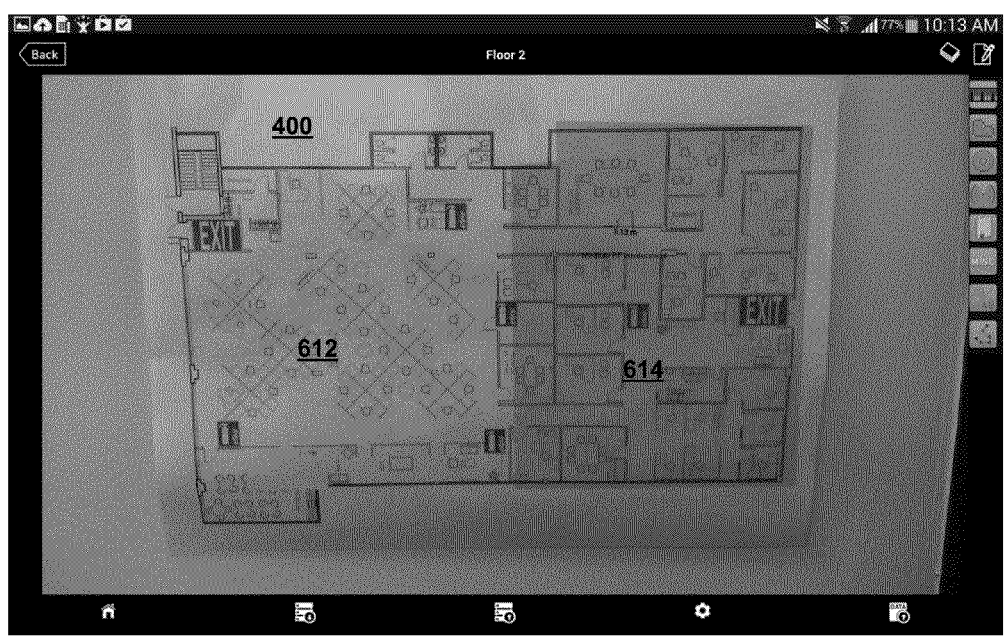
FIG. 6 illustrates three density zones.

The method continues with defining (step 220) at least one density zone on the floor plan 400 displayed on the display 340 via the user interface 350. RF propagation in a building is affected by a multitude of factors, including for example: layout, presence of walls, doors, windows, furniture, cubicles, floors, wall coverings, types of walls, etc. Although average parameters can be used to lighten calculations, the use of averages alone substantially reduces accuracy. To overcome this drawback, the present method and computing device 300 introduce the defining of at least one density zone on the floor plan 400. Reference is now made more particularly to FIG. 2B, which provides an example of how one or several density zones may be defined by means of the user interface 350, on the floor plan 400 shown on the display 340. FIG. 6 illustrates two density zones specified on the floor plan 400; the density zone on the left 612 being of low RF propagation absorption and the density zone on the right 614 being of higher RF propagation absorption. The floor plan 400 shown on FIG. 6 depicts a floor, which is composed of two distinct furniture density areas: an open-space area (the area on the left half of the floor plan corresponding to the density zone 612), and a meeting area with closed offices (the area on the right hand side of the floor plan corresponding to the density zone 614). The floor plan 400 illustrated on FIG. 6 is very simple; however, architects and designers often design floor plans, which include several different types of areas, each area having particular RF propagation density properties.

To define the density zones, the present method 200 and computing device 300 allow a user of to define the shape of a density zone by selecting via the user interface multiple positions on the floor plan 400 around a targeted area (e.g. by clicking multiple times on the floor plan at different positions) to create a closed shape representing the density zone. Alternatively, to define the density zones, the present method 200 and computing device 300 may rely on predefined shapes to be selected, sized and characterized through the user interface 350 by the user of the computing device 300. The predefined shapes include any type of closed shapes, either regular or irregular, predefined or customized. The user may position or draw the selected shape on the floor plan 400 (step 222), size the selected shape to correspond to the zone having RF propagation properties to be characterized, and attribute RF propagation density thereto (step 224). For example, the user may be provided with the following RF propagation densities presented as a drop down list: open RF absorption zone, semi-open RF absorption zone, light RF absorption zone, medium RF absorption zone, high RF absorption zone, very high RF absorption zone. Density of walls, temporary or permanent floor partitions and density of floor furniture determine the RF propagation density. Further, floor plans may be given RF propagation classification according to their configuration and/or intended use. As an example, car garages usually have zero furniture, no partitions, only outside walls and pillars throughout an open space. For that reason garages may be classified as open RF absorption zone. Hospitals, on the other hand, have a lot of internal walls, individual examination rooms that are separated by partitions, lot of furniture, etc. Hospitals are usually very dense environments in terms of objects, which obstruct or absorb radio frequency signals. Consequently, hospitals may be classified as "very high RF absorption zone". In addition to assigning the RF propagation density, the computing device 300 may further allow the user to provide other types of RF propagation properties for the density zone being defined, such as high radio interference areas, radio wave reflection, adjacent microwave tower, adjacent elevator walls, etc. The method 200 further allows the user of the computing device to identify more than one density zone (step 226, and repeating steps 222 and 224 when necessary). When the user has finished defining the specific density zones, the method attributes an average or default interior density (based for example on the intended purpose or classification) (step 228), to the remainder of the floor plan.

The method 200 continues by selecting a RF propagation calculation strategy (step 230). Selection of the RF propagation calculation strategy allows targeting the RF propagation calculations to be performed, so as to reduce RF propagation calculations required. As the processing unit 310 of the computing device may not have the capacity to perform extended and complicated RF propagation calculations, the selection of the RF propagation calculation strategy greatly reduces the calculations required. Furthermore, by reducing the calculations required, the calculations may be performed dynamically, i.e. during displacement of one of the radio cell, instead of only after their positioning. Additional information will be provided later on the aspect of dynamic calculations. Reference is now made more particularly to FIG. 2C, which represents three options of RF propagation calculation strategy. The user of the computing device 300 may opt for specifying a contour distance for the radio cell(s) (step 232), specifying a minimum data rate for the RF propagation (step 234) or specifying a required RSSI (step 234). The RF propagation calculation strategy selected directly impacts the calculations which will be performed, and described later.

Figure 2A:
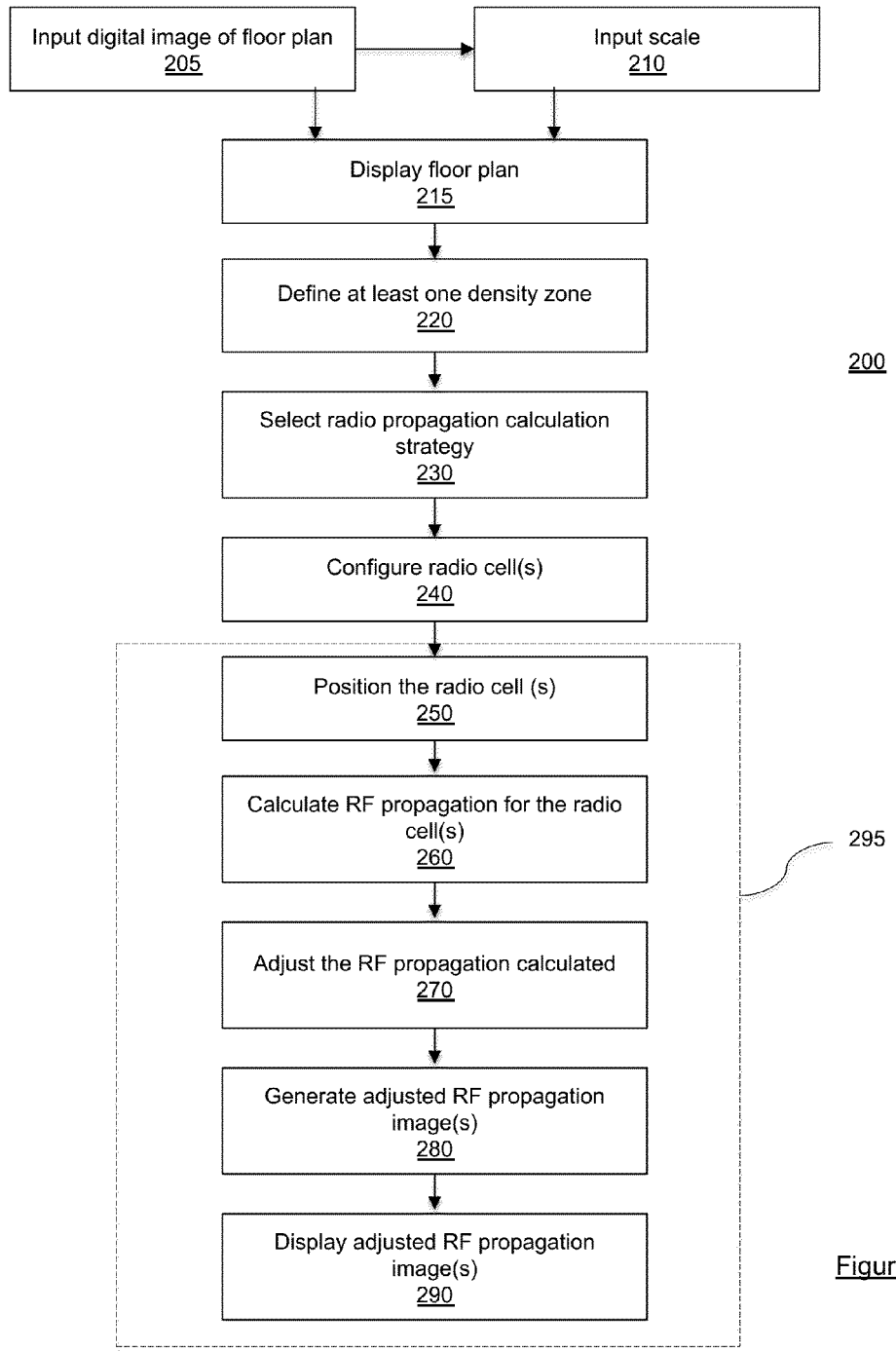
FIGS. 2A to 2D illustrate steps of a method for visual representation of RF propagation.
Figure 2B:
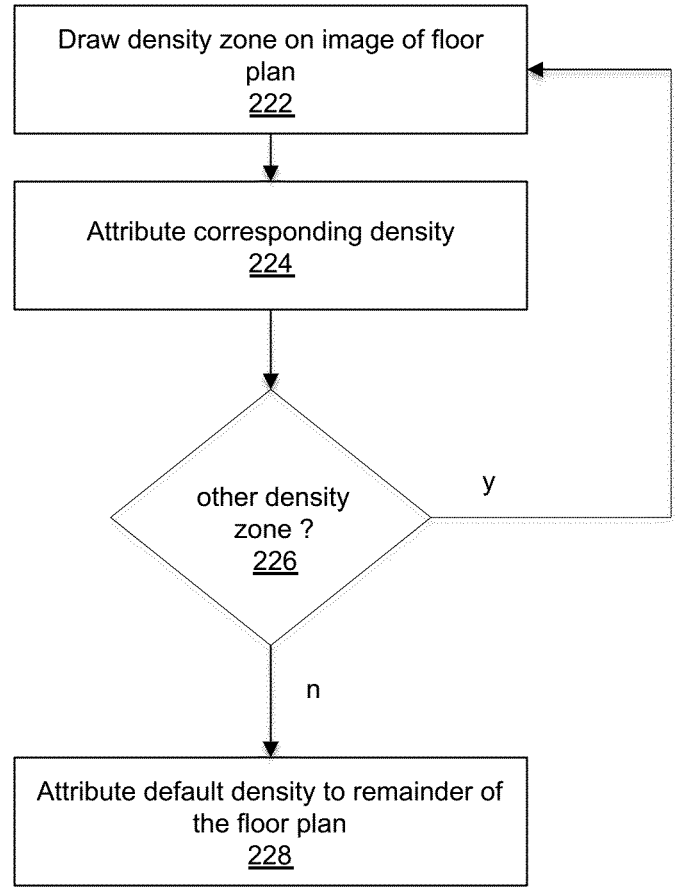
Figure 2C:
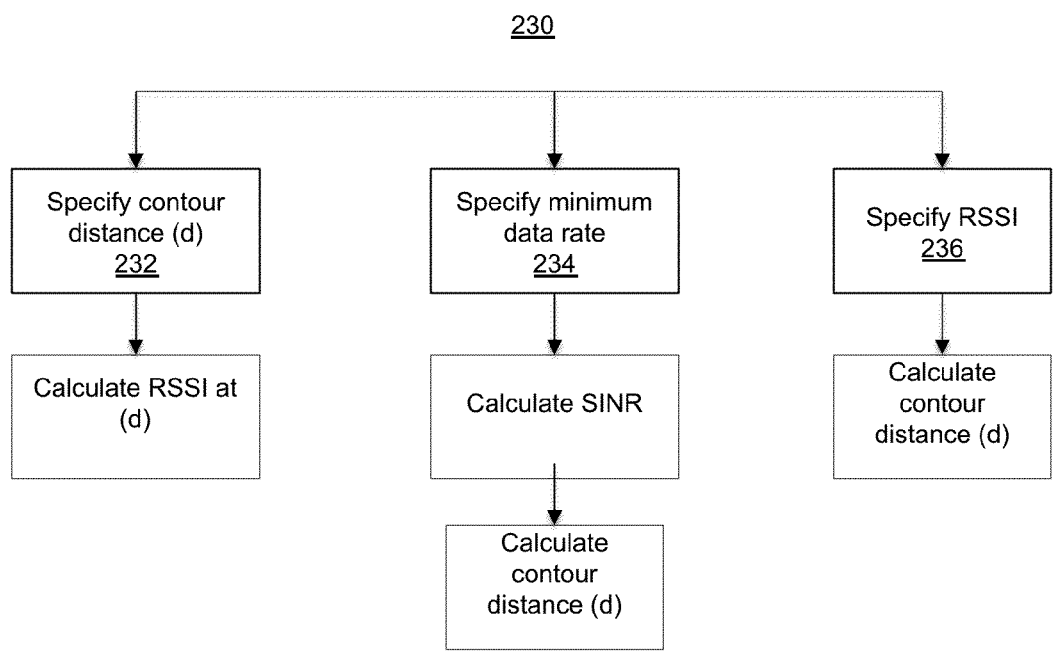

Reverting to FIG. 2A, the method further comprises configuring the radio cell(s) (step (step 240) to be positioned via the user interface 350 on the display 340. Each radio cell may be configured independently, or a first radio cell is configured by the user of the computing device, and the same configuration is automatically applied to other radio cells to be positioned on the floor plan 400. The specific parameters of the radio cell may include at least one of the following: an air interface, an operating frequency, a type of antenna (e.g. omni-directional or multi-directional), an output power, a down tilting, an antenna pattern, and a horizontal and vertical beam width.

Figure 2D:
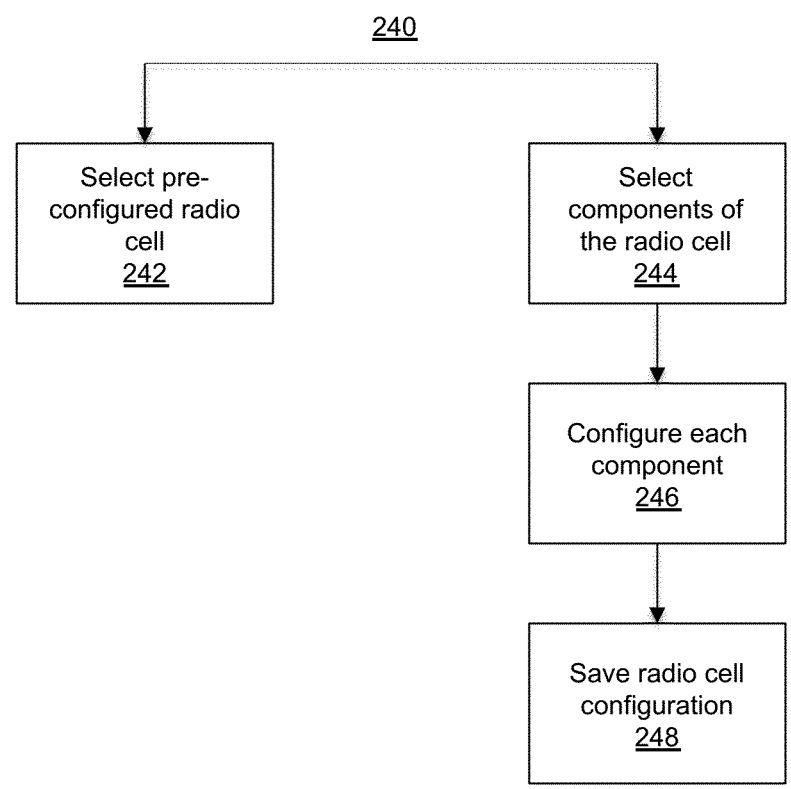

Reference is now concurrently made to FIG. 2D, which represents two alternatives for configuring the radio cell(s) (step 240). In the first alternative, the user selects a pre-configured radio cell (step 242). The pre-configured radio cell already has corresponding parameters. The radio cell(s) could have been configured during a previous session. When the radio cell(s) has been previously configured, the configuration may be extracted, either from the memory 320 of the computing device 300 or the memory 390 of the server 360. In the second alternative, the radio cell(s) is configured by the user of the computing device 300 by selecting, by means of the user interface 350, the components (step 244) and operating parameters (step 246) of the radio cell, from a list of radio cell components, transmission standards and encryption algorithms. The list of radio cell components, transmission standards and encryption algorithms may be stored in the memory 320 of the computing device 300, or may be stored in the memory 390 of the server 360 and accessed by the computing device 300 through its communication interface 330. The list of radio cell components, transmission standards and encryption may be displayed in sequences, or all options offered concurrently to the user of the computing device 300. The configuration of the radio cell may be stored locally in the memory 320 of the computing device 300 for later use and/or upload, or may be stored in the memory 390 of the server 360 in relation to the floor plan and corresponding building information. When configured, the radio cell(s) is then displayed on the display 340 of the user interface 350 as elements to be introduced and positioned in the floor plan 400. The step of configuring 240 repeats for all the cells that need to be configured. It is also possible to go back to the configuring step 240 to configure one or several small cells, or to modify the configuration of one or several of the small cells. The radio cell configuration may also be saved as a pre-selected configuration, as the ones proposed in step 242.

The method continues with positioning (step 250) each of the radio cells over the floor plan 400. The radio cell is positioned over the floor plan 400 by a user of the computing device 300, via the user interface 350. The computing device 300 displays on the display 340 the position of the radio cell over the floor plan 400. The method may then directly calculate via the processing unit 310 the RF propagation (step 260) for the at least one radio cell configured (at step 240) and positioned (at step 250). Alternatively, the method may wait that all the radio cells be positioned over the floor plan, before initiating the calculation of the RF propagation (step 260). Although not shown, the method may ask the user of the computing device after the positioning of a radio cell (step 250), whether RF propagation calculation (step 260) should be initiated for the positioned radio cell(s).

The method may further allow a user to select between calculation of the RF propagation (step 260) of the radio cell positioned during positioning or after positioning on the floor plan 400 via the user interface 350. The calculation of the RF propagation (step 260) is performed based on the configuration of the radio cell, the selected RF propagation calculation strategy, and the position of the radio cell with respect to the at least one density zone.

Concurrently referring to FIGS. 2A and 2C, if the selected RF propagation calculation strategy selected included specifying the contour distance (d) of the radio cell (step 232), then the processing unit 310 of the computing device 300 proceeds with calculating RF propagation by first calculating the Received Signal Strength Indicator (RSSI) at a contour of the radio cell (i.e. a radius of distance d/2), around the point where the radio cell(s) is positioned. The RF propagation calculation (step 260) comprises calculating pathloss (PLS), using the following equation:

$$PLS = 20 \log_{10}(4\pi/c) + 10N \log_{10}(d) + 20 \log_{10}(f) - \sigma$$

where:
  π is 3.141592;
  c is speed of light (3E8);
  f is a transmission frequency of the radio cell as configured;
  N is a propagation constant and σ is a standard deviation specific to a frequency of operation of the radio cell as configured, and density zone where the radio cell is positioned.

The values N and σ are extracted from a database stored in the memory 320. The database provides for each density zone available for selection by the user, for each frequency or on a per frequency band basis, corresponding values of N and σ.

For example, at 1900 MHz, in a semi-open density zone (warehouse, airport terminal), N=2.15 and σ=6 dB, while for high density zone (hospital), N=2.85 and σ=10 dB. Both N and σ are lower at 850 MHz.

Based on the calculated value of PLS, the transmission power as configured (step 240), and the pattern of the radio cell's configured antenna, the processing unit 310 calculates the RSSI at the contour using the following equation: RSSI=Tx+Ag+Am−PLS, where Tx is a transmit power of the radio cell as configured, Ag and Am are antenna gains of the radio cell and a simulated mobile respectively, and PLS corresponds to the pathloss calculation between the two.

Figure 8:
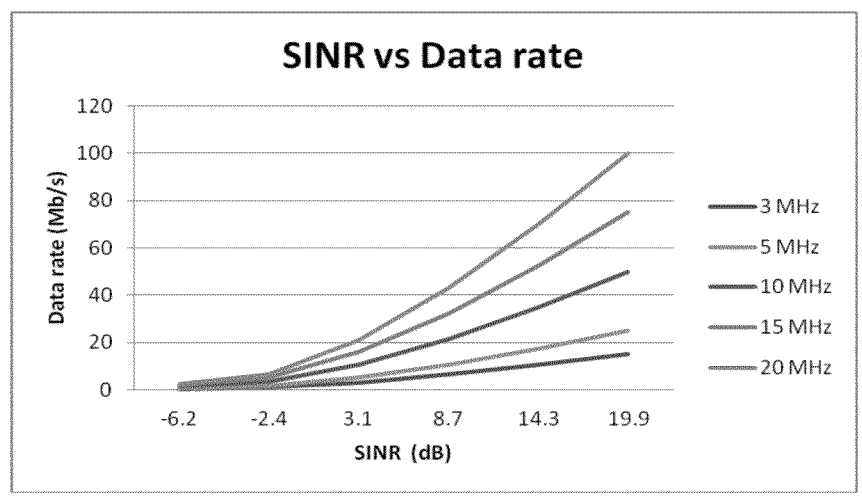
FIG. 8 is a graph of SINR vs data rate, for various transmission frequencies.

If the RF propagation calculation strategy selected (step 230) by the user corresponds to specifying a minimum data rate (step 234), then the processing unit 310 initiates the RF propagation calculation (step 260) by specifying the minimum data rate, for example by choosing a data rate from a list of available data rates for the configured radio cell. Then, minimum SINR for the specified minimum data rate is determined based on known dependencies of SINR vs data rate. The dependencies of SINR vs data rate may be stored in the memory 320. An exemplary graph of SINR vs data rate is shown in FIG. 8. For example, if a radio cell has a RF channel bandwidth of 10 MHz, and the specified minimum data rate is 10.5 Mb/s, the corresponding SINR is 3.1 dB.

Then the processing unit 310 calculates the contour distance (d) for the minimum SINR for each radio cell, so as to obtain SINR heat maps. For M radio cells, and the specified minimum data rate, the contour distance (d) is calculated as follows:
  1. Distances between the centers of the first radio cell and all other radio cells are calculated ($D_{12}$, $D_{13}$, $D_{14}$ ... $D_{1M}$);
  2. Along each distance, D1k, radius r1k is calculated at which SINR(r1k)=SINR_min; and
  3. Out of N−1 radii (r12, r13, r14 ... r1M)*2, the smallest contour distance (d) is chosen as the minimum SINR contour for the first radio cell.

The process is then iteratively repeated for the other M−1 radio cells, until the contour distance (d) of all M radio cells have been calculated. At the end, all M radio cells have a SINR contour within which SINR values are greater than or equal to the minimum required SINR to obtain the specified minimum data rate.

If the selected RF propagation calculation strategy selected (step 230) included specifying RSSI (step 236), then the processing unit 310 initiates RF propagation calculation (step 260) by calculating the contour distance (d) of the radio cell. In this instance of RF propagation calculation strategy, the RF propagation calculation (step 260) performed by the processing unit 310 comprises calculating the PLS using the following equation:

$$PLS = Tx - RSSI + Ag$$

where:
  Tx is the configured transmission power of the small cell;
  RSSI is the value specified by the user (in step 236); and
  Ag is the antenna gain of the configured radio cell.

The contour distance (d) is then calculated as follows:

$$d = 10^{\wedge}[(PLS - 20\log_{10}(4\pi/c) - 20\log_{10}(f) + \sigma)/(10*N)]$$

where π, c, f, N and σ correspond to the parameters previously defined of the density zone where the radio cell is positioned.

The calculation of RF propagation (step 260) performed by the processing unit 310 may also take into consideration additional parameters related to positioning of the radio cell, such as a height of the radio cell, an azimuth of the radio cell, a mounting orientation of the radio cell, etc. The display 340 may further comprise a menu (or any other appropriate graphical element) for assisting in configuring the additional positioning parameters of each of the radio cell.

As previously demonstrated, the calculation of the RF propagation (step 260) of the radio cells performed by the processing unit 310 thus takes into consideration the configuration of the radio cell being positioned, and its position with respect to the at least one density zones. Density zones affect the radio frequency (RF) propagation of the radio cells. By assigning fixed values of n and s in the previous equations for each type of density zone, the calculation of the RF propagation (step 260) is simplified, while preserving accuracy.

The calculation of the RF propagation (step 260) performed by the processing unit 310 may calculate only the value at the contour of the radio cell or continuous (RF) propagation (displayed as a heat map) for the radio cell from its center (position where the radio cell is placed on the floor map 400). Additionally, when the radio cells consist of small cells, the calculation 150 of the RF propagation performed by the processing unit 310 may further take into consideration interference with a macro radio network covering the area.

When the calculation of the RF propagation (step 260) performed by the processing unit 310 is completed and/or updated for all the radio cells positioned on the floor map 400, the method continues with the processing unit 310 adjusting the RF propagation calculated (step 270), so as to take into consideration the scale of the floor plan 400. As the floor plan 400 provided may have been inputted from various origins, and the image of the RF propagation is to be displayed over the floor plan, it is important that the image of the RF propagation of each radio cell be scaled in accordance with the scale of the floor map 400.

The method continues with the processing unit 310 generating an adjusted RF propagation image (step 280) for each radio cell. The adjusted RF propagation image of each radio cell is an image which is on the same scale as the floor map 400 displayed on the display 340, corresponds to the selected RF propagation calculation strategy (step 230), the configuration of the radio cell (step 240), the calculated RF propagation (step 260), and adjusted (step 270) so as to correspond to the scale of the floor plan and take into consideration other positioned radio cells. The generated adjusted RF propagation image of each radio cell corresponds to the visual representation of RF propagation of the radio cell, which is displayed (step 290) by the processing unit 310 on the display 340 of the computing device. The visual representation of RF propagation may have any appropriate shape or format, but is based on the type of antenna and position of the antenna of the radio cell and transmission power of the radio cell. For example, the visual representation may be presented by the processing unit 310 on the display 340 as a heat map, with colors decreasing in intensity or warmth from the highest adjusted RF propagation calculated to the weakest adjusted RF propagation calculated.

To keep the visual representation of RF propagation of multiple radio cells on the same floor plan 400 clear to the user, the present method and processing unit 310 further adjusts the RF propagation calculated (step 270) to relative RF propagation visual representations. The relative RF propagation visual representations prevents overlap of calculated RF propagations (step 260), and generates adjusted RF propagation image (step 280) and display (step 290) of dominant radio cell visual representation.

The shape of the calculated RF propagation is further affected by the antenna pattern of the configured radio cell. There are on the market various antennas, each providing a specific radiation pattern adapted for varied situations. The calculation of the RF propagation of the radio cells in step 260 by the processing unit 310 takes into consideration the antenna type and/or its radiation pattern as configured in step 240. The radiation pattern of the radio cell is particularly important when displaying the visual representation of the calculated RF propagation in step 290, as it directly affects the shape of the visual representation, along with the shape of the other radio cells.

Figure 4B:
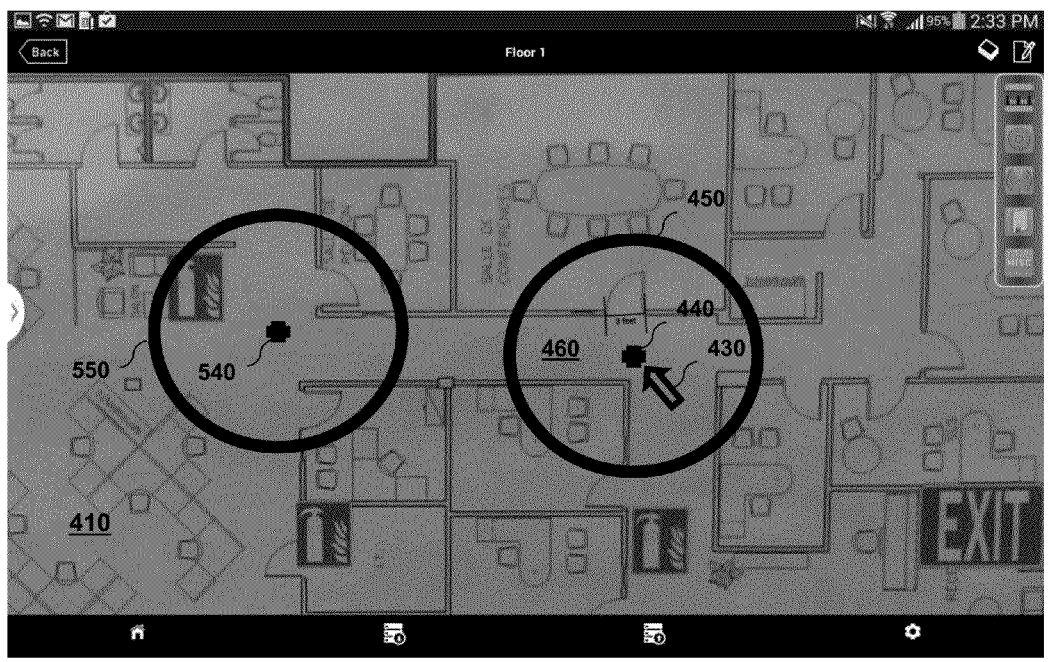

Reference is now made to FIG. 4B, which illustrates a particular example where two radio cells (440 and 540) with circular antennas are displayed on the floor map 400 of the display of the computing device 300. For each radio cell 440 and 540, a visual representation (respectively 450 and 550) of the adjusted RF propagation calculated is displayed (step 290) on the floor map 400. Although FIG. 4B illustrates two circles 450 and 550 as adjusted RF propagation calculated (also called hereinafter RF propagation visual representation), the present is not limited to circles which are only used in the present context to represent the overlay of RF propagation visual representations over a floor plan including various density zones. The RF propagation has been calculated by the processing unit 310 for the radio cells 440 and 540 as previously described in step 260.

Figure 4C:
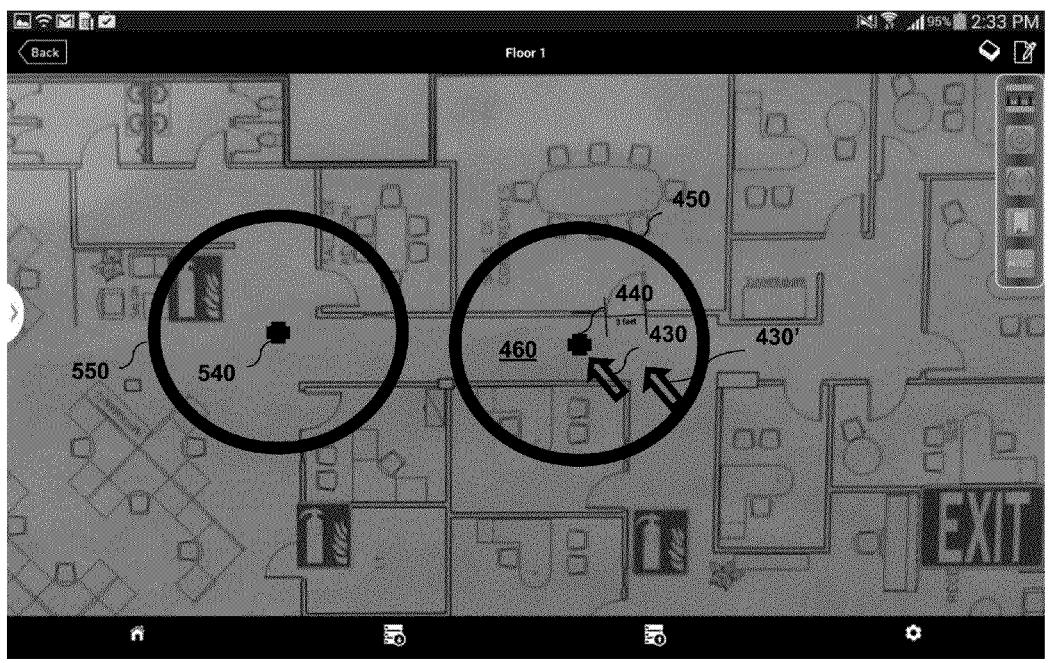
Figure 4D:
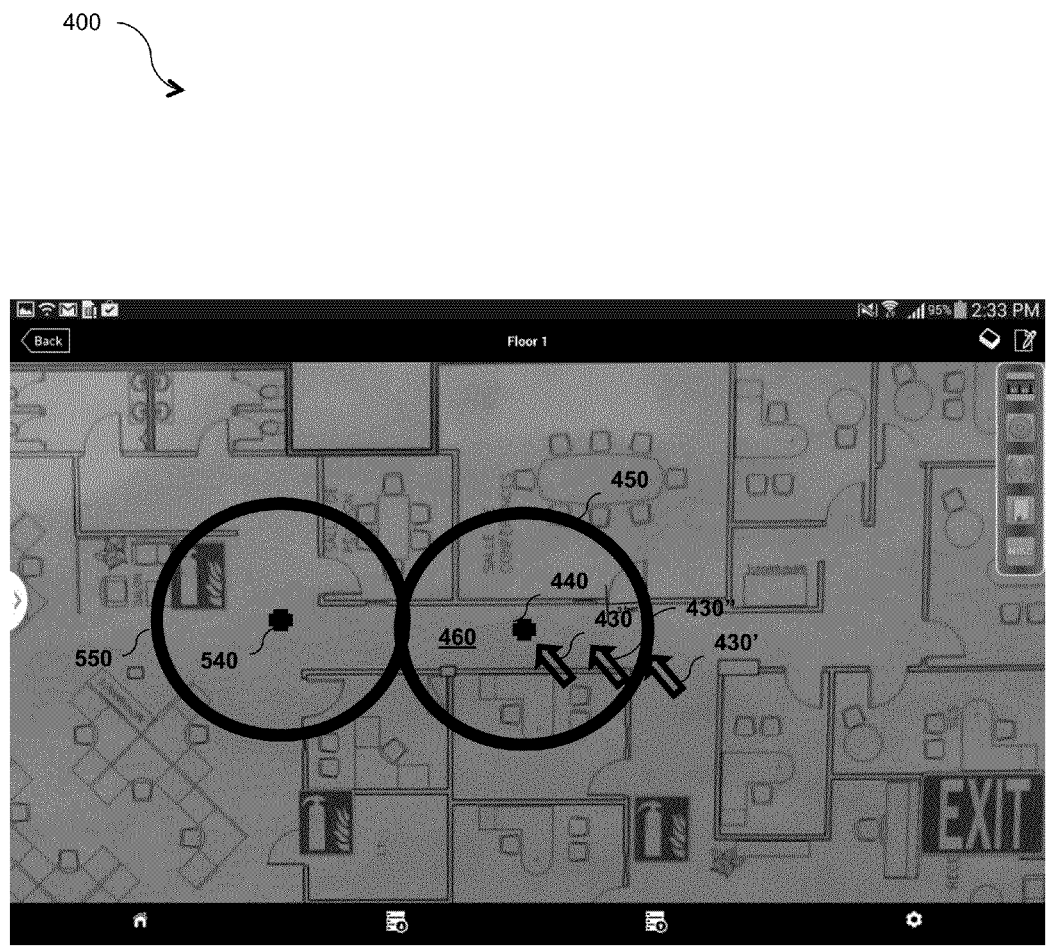

For simplification purposes only, circles are used as RF propagation visual representation of the radio cells 440 and 540 in FIGS. 4A-D. In FIGS. 4B-D, the RF propagation visual representations displayed could further consist of concentric circles (as shown on FIG. 5), where each concentric circle corresponds to a level of adjusted RF propagation calculated such as signal strength. However, the present method, computing device and program are not limited to circular RF propagation visual representations, and the represented circles should not be used to limit the scope of protection sought.

Figure 7:
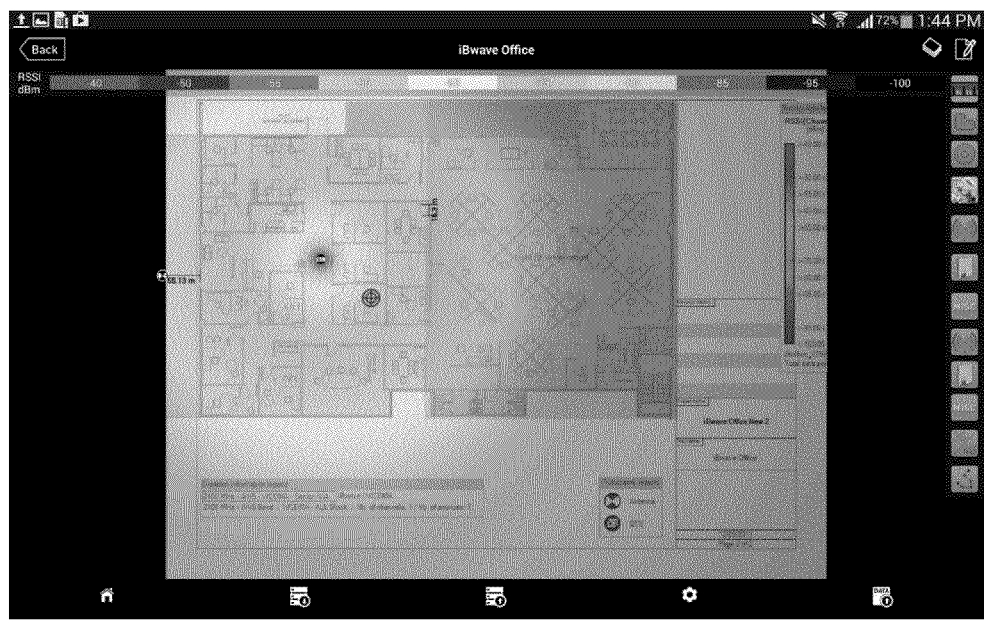
FIG. 7 illustrates a heat map showing RF propagation with two defined density zones.

For example, the RF propagation may be displayed as a propagation contour (FIG. 4B-D) or as a heat map (FIG. 7) The RF propagation visual representation 450 graphically depicts a shape of the RF propagation 460 in the area 410 corresponding to a portion of the floor of the building where a device with an air interface compatible with the radio cell 440 can use the radio cell 440 for communicating. The RF propagation contour is shaped based on the type of antenna of the radio cell. The type of antenna is configured by the user in step 240 of the method. Thus, in the example shown in FIGS. 4B-4D, where omnidirectional antenna are used, calculating the RF propagation by the processing unit 310 consists of calculating the radius of the RF propagation contour, and adjusting the RF propagation calculated (step 270) by the processing unit 310 consists in comparing the calculated radius of the contour with adjacent contour's radius to determine a relative radius. The processing unit 310 further adjusts (in step 270) the RF propagation calculated with the scale of the floor map 400 to display the circular RF propagation visual representation 450 with accurate proportions with respect to the other elements displayed on the floor map 400.

Those skilled in the art will understand that if one of several radio cells positioned on the area rely on antennas with non-circular RF propagation patterns, the present method, computer system and program will determine the relative RF propagation visual representation between the positioned cells as previously described, and considering the respective RF propagation pattern of each radio cell.

In a particular alternative illustrated in FIG. 2A, the RF propagation of radio cell is calculated (step 260) while the radio cell is displaced in on the floor plan 400. The steps 260, 270, 280 and 290 are performed dynamically (shown as 295) when the radio cell is displaced over the floor map. The steps 250, 260, 270, 280 and 290 can be performed only for the radio cells being displaced, and not performed for the radio cells already positioned. Additionally, for the same radio cell, an initial in position calculation can be performed, followed by one or more in displacement calculations of the RF propagation (step 295). Thus, the present method 200 and computing device 300 may support static RF propagation visual representation only (after positioning of step 250), dynamic RF propagation visual representation (i.e. in displacement calculations only such as shown in step 295), or a combination of static and dynamic RF propagation visual representation of the radio cells over the floor plan 400.

The dynamic RF propagation visual representation allows the user of the computing device 300 to select the radio cell to be positioned through the user interface 350. The selected radio cell may be radio cell configured at step 240, but not yet positioned on the floor map 400. Alternatively, the user may select via the user interface 350 one of the radio cells already positioned on the floor map 400 for displacement. When dynamic RF propagation visual representation is actuated on the computing device 300, the method dynamically calculates the RF propagation (step 260) of the displaced radio cell, adjust the RF propagation calculated (step 270), generates the adjusted RF propagation image (step 280 and displays the adjusted RF propagation image (step 290), while the radio cell is being displaced over the floor map 400. Furthermore, all the specificities and alternatives of the calculations, which have been previously described in relation to step 260, are applied.

Dynamic RF propagation visual representation of the radio cell in displacement may be performed dynamically or after the selected radio cell stays in over one position of the floor plan 400 for a predetermined period of time, such as for example after 2 seconds, or when the selected radio cell is positioned (dragged and dropped) before the expiration of the predetermined period of time.

FIG. 4B further illustrates a pointer 430 (actuated via the user interface 350) for placing on the position occupied by the radio cell 440 over the floor plan 400. The pointer 430 may consist of an arrow (or any other shape usually used as a pointer) controlled by the user via its interactions with the user interface 350. This type of pointer 430 is generally used when the user interface 350 is a mouse or a trackpad. Alternatively, the pointer 430 may simply consist of a finger of the user when the display 340 is a touchscreen, which also serves as a user interface.

FIG. 4B illustrates an initial position of the pointer 430 (and the corresponding selected radio cell 440). FIG. 4C illustrates the pointer 430 (and the corresponding selected radio cell 440) being displaced from the initial position to a new position. Reference numeral 430' in FIGS. 4C and 4D represents the initial position of the pointer 430 in FIG. 4B. FIG. 4D illustrates the pointer 430 (and the corresponding selected radio cell 440) being displaced from the new position of FIG. 4C to another new position. Reference numeral 430" in FIG. 4D represents the position of the pointer 430 in FIG. 4C.

Displacing the selected radio cell 440 over the floor plan 400 allows the user to determine a position for the radio cell 440, which is compatible with the topology of the area of the building. For example, the radio cell 440 may be positioned close to a wall, within a particular room, at a particular position within the room, etc. The determined position takes also into consideration RF propagation of the radio cell 440, in the RF propagation visual representation over the floor plan 400, as illustrated in the following.

The user may determine that the current position of the selected radio cell 440 being displaced is satisfying based on several criteria, including: the RF propagation visual representation 450 is indicative of an optimal radio coverage provided by the selected radio cell 440, interferences with other radio cells positioned over the floor map 400 are limited, etc. The user may indicate that the current position of the selected radio cell 440 in displacement is satisfying through a particular interaction via the user interface 350. The position of the selected radio cell 440 determined to be satisfying can be permanently memorized in the memory 320 (as well as the calculated and adjusted RF propagation and/or the corresponding RF propagation visual representation 450 for this position). However, the user may reselect the radio cell 440 at any time, displace it over the floor map 400 (triggering the calculation 151 of the RF propagation and the display of the corresponding visual representation while the selected radio cell is in displacement), until a new satisfying position of the radio cell 440 is determined, and permanently memorized in the memory 320.

The determined position of the radio cell 440 (as well as the calculated and adjusted RF propagation and/or the corresponding RF propagation visual representation 450 for this position) may also be transmitted to the server 360 via the communication links 355, for memorization in the memory 390 of the sever 360. The server 360 may act as a central repository for the determined position (as well as the calculated and adjusted RF propagation and/or the corresponding RF propagation visual representation for this position) of all the radio cells deployed in a particular building. The server 360 may further memorize these data for several buildings corresponding to several customers, and the server 360 may organize these data by allocating a different identifier for each different customer and/or each different building; with an adequate level of confidentiality and security for the data associated to each particular identifier. Thus, several users using several computing devices 300 can have access to the data related to a particular customer/particular building (provided they have been granted access to these data based on a confidentiality and security policy associated to the data), to consult and/or update the data.

In the case where the user interface 350 is a mouse (or a trackpad), the user may select the radio cell 440 by positioning the pointer 430 of the mouse (or trackpad) on the radio cell 440 and clicking on a button of the mouse. Then, the user moves the mouse while maintaining the button engaged. The pointer 430 (corresponding to the position of the radio cell 440) is displaced over the floor map 400 according to the movement of the mouse. If the pointer 430 remains at the same position for a duration longer that a predefined threshold (e.g. one second), the RF propagation is calculated (step 260) and adjusted (step 270) for the selected radio cell 440 in the current position of the pointer 430 on the floor map 400 even though the selected radio cell 440 is still in displacement and the current position has not been confirmed by the user, and the corresponding RF propagation visual representation 450 is displayed on the area 410 at the current position of the pointer 430. When the user releases the button of the mouse, the current position of the radio cell 440 is determined to be satisfying and confirmed by the user.

In the case where the user interface 350 is a touchscreen, the sequence is similar to the sequence described with the mouse or trackpad. Positioning one finger of the user on the touchscreen and holding it until a threshold is met corresponds to clicking with a button of the mouse. Moving the finger of the user corresponds to moving the mouse. Withdrawing the finger of the user corresponds to releasing the button of the mouse.

The radio cell (e.g. 540) and the corresponding RF propagation visual representation (e.g. 550) of the calculated (step 260)/adjusted (step 270) RF propagation image displayed over the floor map 400 may be removed via a pre-determined interaction of the user via the user interface 350.

Alternatively, the calculations (step 260) and adjustments (step 270) may be performed by the processing unit 370 of the server 360 based on data transmitted through the communication links 355 by the computing device 300. The calculated RF propagations (step 260) and adjusted RF calculations (step 270) are then transmitted by the server 360 to the computing device 300 through the communication links 355, and the corresponding RF propagation visual representations are displayed on the display 340 of the computing device 300.

Although the present method 100 has been described in relation to FIGS. 4B-D by illustrating a selection and a displacement of the radio cell 440 displayed on the floor map 400, the method 100 may be applied in a similar manner (selection and displacement) to the radio cell 540 displayed on the floor map 400.

Figure 5:
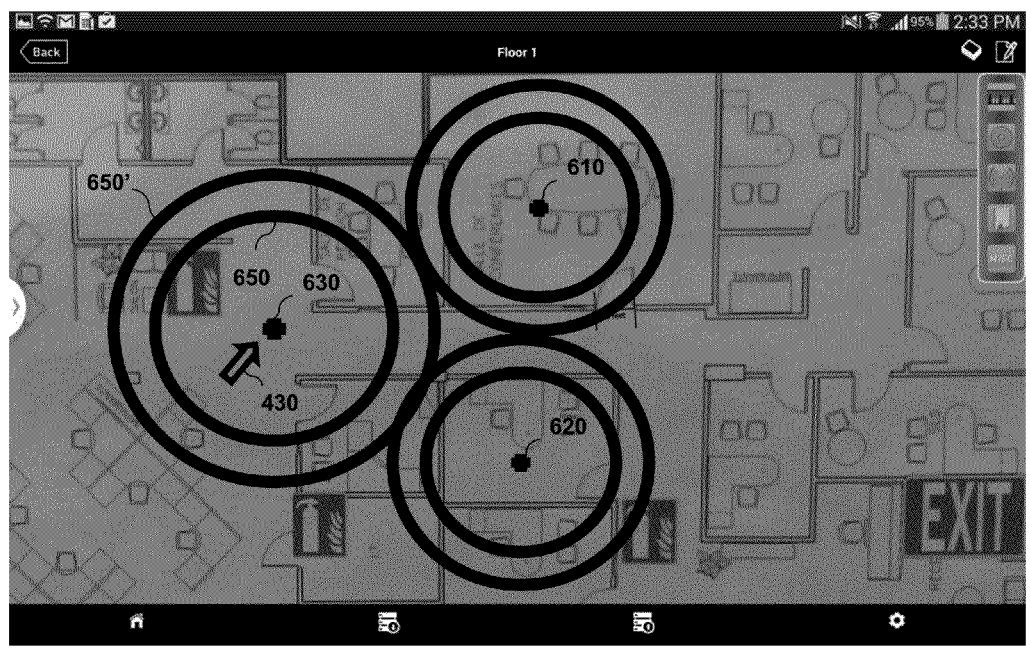
FIG. 5 illustrates the method of FIG. 2, according to a second embodiment involving three radio cells.

FIG. 5 illustrates another example with three radio cells 610, 620 and 630, the RF propagation visual representation of each radio cell being represented by two concentric circles. The radio cells 610 and 620 have been positioned on the floor map 400, so as to optimize their respective coverage of a portion (e.g. a room), while minimizing the interferences between them. The third radio cell 630 is displaced on the floor map 400 along the pointer 430, in order to find a position which optimizes its coverage of a particular portion (e.g. an open-space) of the floor map 400, while minimizing its interferences with radio cells 610 and 620. The RF propagation of the radio cell 630 is calculated during the displacement of the radio cell 630, as previously discussed. The RF visual representation (concentric circles 650 and 650') corresponding to the calculated and adjusted RF propagation is displayed on the floor map 400, during the displacement of the radio cell 630. As mentioned previously, calculations and adjustments of RF propagations may occur at the same time for positioned radio cells 610 and 620, taking into consideration interferences with the selected radio cell 630 being in displacement.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for visual representation of RF propagation of at least one radio cell on a floor plan of a building, the method comprising:

displaying a digital image of the floor plan on a display of a computer device;

defining at least one two-dimensional density zone on the floor plan via a user interface of the computing device;

selecting via the user interface of the computing device a RF propagation calculation strategy, the selected RF propagation calculation strategy comprising a specific algorithm for calculating RF propagation for each of the at least one radio cell, the specific algorithm determining an amount of calculation performed by a processing unit of the computing device;

configuring the at least one radio cell via the user interface of the computing device;

positioning the at least one radio cell over the digital image of the floor plan displayed on the display of the computing device via the user interface of the computing device;

calculating by the processing unit the RF propagation for each of the at least one radio cell based on: configuration of the radio cell, the selected propagation calculation strategy and position of the radio cell with respect to the at least one two-dimensional density zone;

adjusting by the processing unit of the computing device the calculated RF propagation for each of the at least one radio cell as a function of a scale of the floor plan;

generating by the processing unit the visual representation of the adjusted RF propagation for each of the at least one radio cell; and displaying by the processing unit on the display of the computing device the visual representation of adjusted RF propagation for each of the at least one radio cell over the image of the floor plan.

2. The method of claim 1, further comprising inputting via a communication interface of the computing device the digital image of the floor plan in a memory of the computing device.

3. The method of claim 1, further comprising inputting via the user interface of the computing device the scale used for graphically representing the floor plan in the digital image.

4. The method of claim 1, wherein the visual representation of RF propagation is a heat map.

5. The method of claim 1, wherein the following is performed dynamically when positioning the radio cell:
calculating RF propagation for the radio cell;
adjusting the RF propagation calculated;
generating the adjusted RF propagation image; and
displaying the adjusted RF propagation image.

6. The method of claim 1, wherein the at least one radio cell is a small cell.

7. The method of claim 1, wherein calculating the RF propagation calculated takes into consideration interferences with a macro radio network near the building.

8. The method of claim 1, wherein the calculated RF propagation corresponds to Signal to Noise Interference Ratio (SINR) of the at least one radio cell relative to other radio cells positioned over the image of the floor plan, and the adjusted RF propagation is a maximum achievable data rate calculated based on the SINR.

9. The method of claim 1, wherein calculating the RF propagation for each of the at least one radio cell takes into consideration configuration parameters of the at least one radio cell, the configuration parameters including at least one of: a particular air interface, an operating frequency, a type of antenna, an output power, a down tilting, an antenna pattern, and a horizontal and vertical beam width.

10. The method of claim 1, wherein the at least one density zone defined corresponds to an area of the floor plan of the building with RF propagation density different than the remainder of the floor plan, and calculating the RF propagation for the at least one radio cell takes into consideration the specific RF propagation density of the at least one density zone defined.

11. A computing device for visually representing RF propagation of at least one radio cell on a digital image of a floor plan, the computing device comprising:
a display for:
displaying the digital image of the floor plan and the visual representation of RF propagation of the radio cell;
a user interface for:
defining at least one two-dimensional density zone on the image of the floor plan;
selecting a RF propagation calculation strategy, the selected RF propagation calculation strategy comprising a specific algorithm for calculating RF propagation for each of the at least one radio cell, the specific algorithm determining an amount of calculation performed by a processing unit of the computing device;
configuring the at least one radio cell; and
positioning the at least one radio cell over the digital image of the floor plan;
the processing unit for:
calculating the radio RF propagation of each of the at least one radio cell based on: configuration of the at least one radio cell, the selected propagation calculation strategy, and position of the at least one radio cell with respect to the two-dimensional density zone;
adjusting the calculated RF propagation for each of the at least one radio cell as a function of a scale of the floor plan, to generate the visual representation of RF propagation of each one of the at least one radio cell.

12. The computing device of claim 11, wherein the visual representation of RF propagation is displayed as a heat map.

13. The computing device of claim 11, wherein the processor dynamically calculates the RF propagation for the radio cell, adjusts the RF propagation calculated, generates the adjusted RF propagation image, and displays the adjusted RF propagation image while positioning the radio cell on the image of the floor plan.

14. The computing device of claim 11, wherein the at least one radio cell is a small cell and calculating the RF propagation of the small cell takes into consideration interferences with a macro radio network near the building.

15. The computing device of claim 11, wherein calculating the RF propagation of the at least one radio cell takes into consideration interferences with the other radio cells positioned on the image of the floor plan.

16. The computing device of claim 11, wherein the RF propagation calculation strategy is selected from one of the following: specifying a contour distance for the at least one radio cell; specifying a minimum data rate for the at least one radio cell and specifying Received Signal Strength Indicator.

17. The computing device of claim 11, wherein calculating the RF propagation for each of the at least one radio cell takes into consideration configuration parameters of the radio cell, the configuration parameters including at least one of: a particular air interface, an operating frequency, a type of antenna, an output power, a down tilting, an antenna pattern, and a horizontal and vertical beam width.

18. A non-transitory computer program product comprising instructions deliverable via an electronically-readable media such as storage media and communication links, the instructions when executed by a processing unit of a computing device provide visual representation of RF propagation of at least one radio cell on a floor plan of a building by:

displaying a digital image of the floor plan on a display of the computing device;

defining at least one two-dimensional density zone on the floor plan via a user interface of the computing device;

selecting via the user interface of the computing device a RF propagation calculation strategy, the selected RF propagation calculation strategy comprising a specific algorithm for calculating RF propagation for each of the at least one radio cell, the specific algorithm determining an amount of calculation performed by a processing unit of the computing device;

configuring the at least one radio cell via the user interface of the computing device;

positioning the at least one radio cell via the user interface of the computing device;

calculating by the processing unit of the computing device the RF propagation for each of the at least one radio cell based on: configuration of the radio cell, position of the radio cell with respect to the two-dimensional density zone and the selected propagation calculation strategy;

adjusting by the processing unit of the computing device calculated RF propagation for each of the at least one radio cell as a function of a scale of the floor plan;

generating by the processing unit the visual representation of adjusted RF propagation for each of the at least one radio cell; and displaying on a display of the computing device the visual representation of the adjusted RF propagation for each of the at least one radio cell on the floor plan.

19. The computer program product of claim 18, wherein the visual representation of RF propagation is displayed as a heat map.

* * * * *